(12) United States Patent
Mahan

(10) Patent No.: US 8,052,348 B2
(45) Date of Patent: Nov. 8, 2011

(54) EROSION CONTROL SYSTEM

(75) Inventor: Wesley A. Mahan, Geneva on the Lake, OH (US)

(73) Assignees: Wesley A. Mahan, Geneva on the Lake, OH (US); Miki Leonhart, Cape Coral, FL (US)

( * ) Notice: Subject to any disclaimer, the term of this patent is extended or adjusted under 35 U.S.C. 154(b) by 16 days.

(21) Appl. No.: 12/339,655

(22) Filed: Dec. 19, 2008

(65) Prior Publication Data

US 2010/0158617 A1   Jun. 24, 2010

(51) Int. Cl.
*E02B 3/06*   (2006.01)
(52) U.S. Cl. ............. 405/31; 405/16; 405/21; 405/35; 405/302.6
(58) Field of Classification Search ............. 405/15, 405/16, 17, 19, 20, 21, 25, 30, 31, 34, 35, 405/302.4, 302.6
See application file for complete search history.

(56) References Cited

U.S. PATENT DOCUMENTS

| | | | | |
|---|---|---|---|---|
| 1,778,574 A * | 10/1930 | Thornley | ............. | 405/286 |
| 2,420,228 A * | 5/1947 | Condon | ............. | 405/286 |
| 2,466,343 A * | 4/1949 | Weber | ............. | 405/34 |
| 3,282,054 A * | 11/1966 | Saginor | ............. | 405/262 |
| 4,067,166 A * | 1/1978 | Sheahan | ............. | 405/284 |
| 4,494,892 A * | 1/1985 | Wojciechowski | ............. | 405/262 |
| 4,613,255 A * | 9/1986 | Bruer | ............. | 405/286 |
| 4,666,334 A * | 5/1987 | Karaus | ............. | 405/31 |
| 4,684,294 A * | 8/1987 | O'Neill | ............. | 405/286 |
| 4,804,294 A * | 2/1989 | Barthel | ............. | 405/30 |
| 4,856,934 A * | 8/1989 | Nelson | ............. | 405/30 |
| 5,044,833 A * | 9/1991 | Wilfiker | ............. | 405/262 |
| 5,221,157 A * | 6/1993 | Prestedge | ............. | 405/31 |
| 5,393,169 A * | 2/1995 | Creter | ............. | 405/25 |
| 5,586,835 A * | 12/1996 | Fair | ............. | 405/30 |
| 5,697,736 A * | 12/1997 | Veazey et al. | ............. | 405/21 |
| 6,659,686 B2 * | 12/2003 | Veazey | ............. | 405/16 |
| 6,672,799 B2 * | 1/2004 | Earl | ............. | 405/16 |
| 7,527,453 B2 | 5/2009 | Smith | | |
| 2003/0091391 A1 * | 5/2003 | Veazey | ............. | 405/16 |

OTHER PUBLICATIONS

Contech Construction Products Inc., Earth Stabilization Solutions, Armortec Family of Products, ArmorLoc, ArmorLoc Interlocking Concrete Blocks, Nov. 12, 2009, 2 pages, 2009 CONTECH Constructions Products, Inc., http://www.contech-cpi.com/ess/products/contech_hard_armor/armortec_family/armorloc/221.

(Continued)

*Primary Examiner* — Frederick L Lagman
(74) *Attorney, Agent, or Firm* — Scott M. Oldham, Esq.; Hahn Loeser + Parks LLP

(57) ABSTRACT

An erosion control wall system is provided and methods of making it that protect a bank, beach or bluff from soil/sand erosion. The erosion control system includes a plurality of wall members, each formed to have a front face that dissipates and deflects the energy from oncoming waves and a rear face with a stabilizing member extending therefrom for securing the wall member in position along a bank or bluff, or in the water adjacent to a bank, bluff or beach for example. The wall sections are self-stabilizing by action of sand, gravel and/or stone flowing over the wall section and anchoring the stabilizing member. The erosion control wall sections may be constructed on-site using slip form construction methods.

11 Claims, 5 Drawing Sheets

OTHER PUBLICATIONS

Contech Construction Products Inc., Earth Stabilization Solutions, CONTECH Hard Armor, Armortec Family of Products, Nov. 12, 2009, 2 pages, 2009 CONTECH Constructions Products, Inc., http://www.contech-cpi.com/ess/products/contech_hard_armor/armortec_family/175.

International Erosion Control Systems, Cable Concrete, Nov. 12, 2009, 1 p., 2009 IECS—Website Designed and Hosted by CTP Computers, http://www.internationalerosioncontrolsystems.com/index.html.

Whisprwave, Innovative Maritime Solutions, Floating Breakwaters Provide Erosion Control Protection & Wave Attenuation: WhisprWave Floating Breakwaters—Wave Attenuation, Floating Breakwater: Erosion Protection Technology to Stop Erosion Problems, Nov. 12, 2009, 2 pages, http://www.whisprwave.com/floating.htm.

* cited by examiner

EROSION CONTROL SYSTEM

BACKGROUND AND SUMMARY OF THE DISCLOSURE

The present disclosure relates to an erosion control wall system that protects a beach, bank or bluff from soil erosion and methods relating thereto.

Shorelines and beaches may be subject to erosion from the action of waves or movement of water. Wave action may erode beaches by several different mechanisms. Waves mobilize shoreline materials and then redistribute them, leading to erosion. Rising and falling water levels may erode beaches over a long period of time. Shoreline structures, including seawalls, pilings and levees, often increase beach erosion adjacent to those structures, by causing wave reflection, turbulence, eddies and currents. These currents mobilize the beach materials which may be transported along shore or offshore. Offshore currents can carry the beach materials many miles away until the current slows and the beach materials sink due to the influence of gravity.

Further, heavy storms can impinge high waves on beaches and shorelines, imparting forces which carry away the beach or crumble the shoreline leading to erosion. During severe storm conditions, when the waves are commonly two to three, and occasionally ten times their normal height, the typical beach response is the loss of material from the beach zone.

Municipalities and individuals often place sand on the shoreline to establish a beach to increase the leisure value of shoreline. Storms having higher wave heights than normal will often severely depreciate the amount of beach material. During such storms, the artificial beaches commonly wash away, because the shoreline, sea bed or lake bed structure is not compatible with the existence of a beach at the location of the artificial beach.

Erosion control wall systems may reduce erosion at a bank or bluff by diverting and dissipating the energy from oncoming waves. Known erosion control systems have various deficiencies, such as not dissipating wave or water movement effectively. Systems are also subject to movement or destruction from the wave action or water movement itself, reducing the effectiveness.

The erosion control wall system of the invention provides a system which is both effective and resists movement or destruction. The wall system and methods may utilize slip form construction. Slip form construction allows constructing wall sections according to the invention in place that results in reduced construction periods and cost savings. The slip form method can be applied with benefit to a range of structures for a predetermined location and environment. Openings, tapering profiles, reductions in wall thickness and large embodiments can be accommodated. The use of slip form manufacturing results in significant cost benefits when compared with traditional formwork or jump form systems. The slip form process may be used during almost every weather condition. Construction requirements for slip form can be met in any but the most severe of weather conditions. The erosion control structures as presently disclosed can be formed using slip form construction at a site, and the wall sections can be positioned, avoiding the need for transportation and/or storage of such systems.

According to the present disclosure, the erosion wall system stabilizes the soil along a bank or a bluff. The wall system includes a plurality of members, each having a center section, one or more sidewalls, a front face extending from the left sidewall to the right sidewall; wherein the front face is positioned to divert wave energy from incoming waves near a beach or bank, or relative to movement of water adjacent thereto. A rear face is formed to extend from the left sidewall to the right sidewall that stabilizes the retention wall in position, and a stabilizing member extending from the rear face. The member further includes a top face, and a bottom support surface.

A present disclosure also relates to a method of on-site manufacturing of erosion control wall sections that includes providing a slip form having a front section, back section and stabilizing member section. The method includes positioning rebar inside the front section, back section, and stabilizing member section, and pouring concrete into a slip form having a front section, back section, and stabilizing member section. The wall section is the sealed, wherein sealing of the front section, back section and stabilizing member section is performed with a sealing compound, to strengthen the surfaces thereof for enhanced wearing and longevity.

DETAILED DESCRIPTION OF THE DRAWINGS

Figure 1:
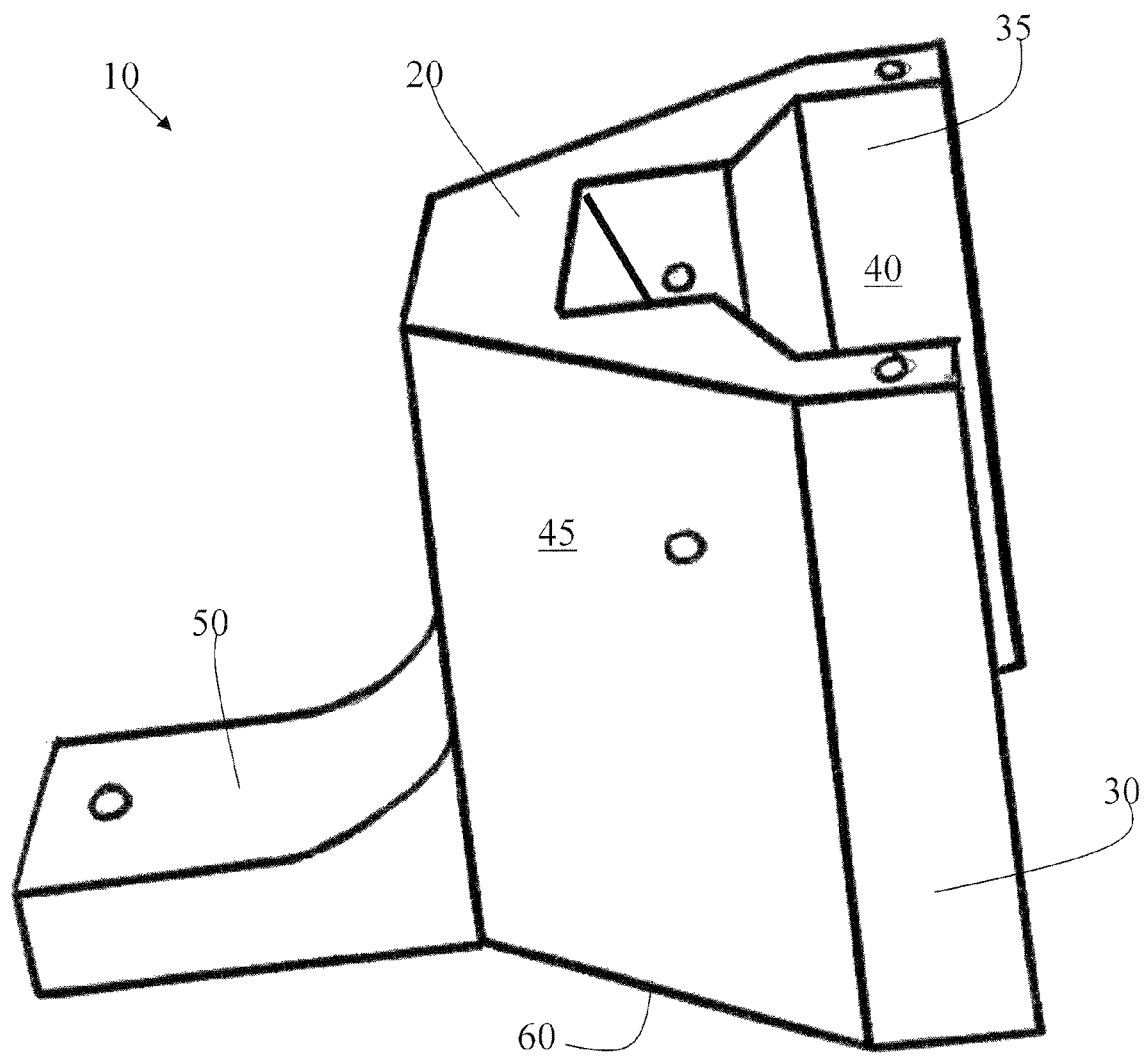
FIG. 1 is a perspective view of an example erosion control wall section.

Referring now to FIG. 1, an example of an erosion wall section is shown that controls soil erosion caused by waves or water movement hitting banks, beaches or bluffs along the shoreline of oceans, lakes, rivers, or other bodies of water. The erosion control system; will comprise a plurality of wall members 10, with each wall member 10 having a center section 20, a left sidewall 30, a right sidewall 35, a top face 55, a bottom face 60, a front face 40 positioned to divert wave energy from incoming tidal waves near a bank or shoreline, and a rear face 45 that stabilizes the erosion control wall section 10 through a stabilizing member 50 extending from the rear face 45. The front face 40 is positioned toward the body of water (seaward) and the rear face 45 is positioned toward the land or shore (landward). The placement of the erosion control wall section 10 enables dissipation of wave energy and stabilization of the erosion control wall section 10 along the bank of bluff. The erosion control wall section 10 is placed on a bank or bluff with the top face 55 positioned upward and a bottom face 60 positioned downward or adjacent to the earth. The presently disclosed system is not limited to this particular configuration and may be placed along the bank of bluff at various angles or configurations to reduce soil erosion.

Figure 2:
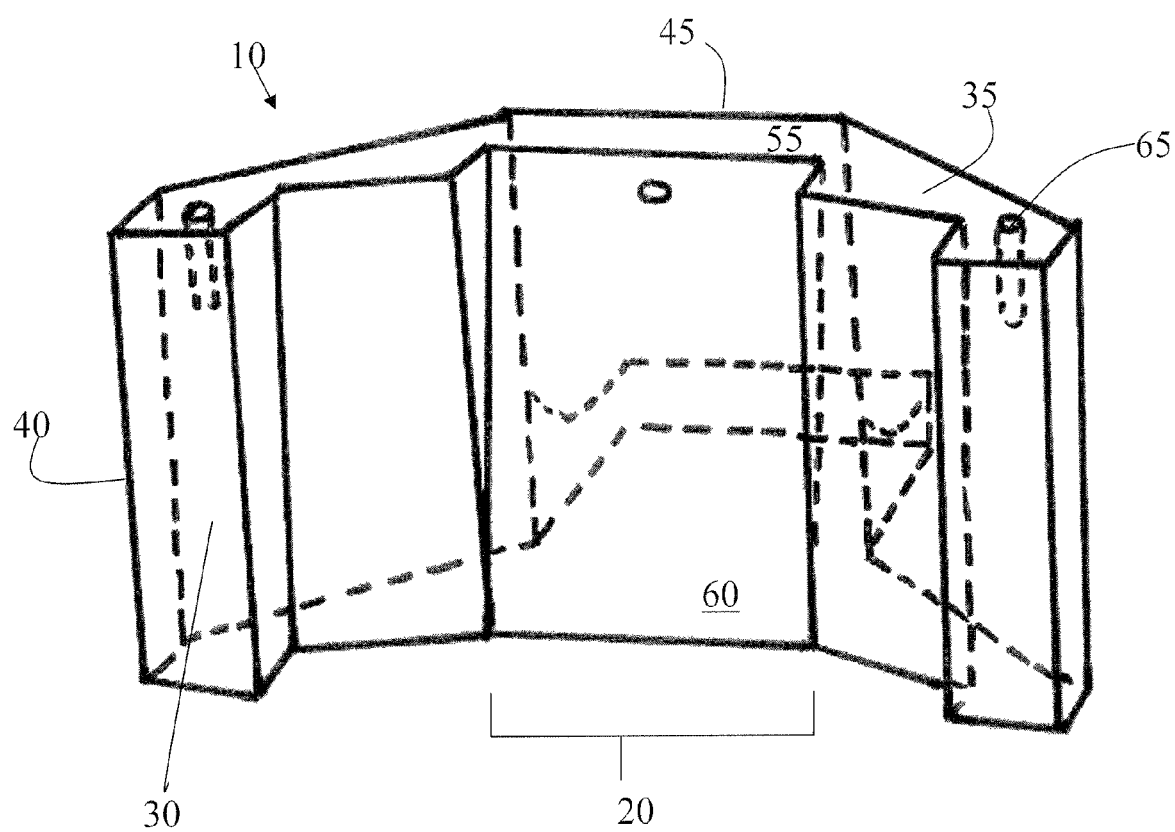
FIG. 2 is another perspective front view showing the rear in hidden lines.
Figure 3:
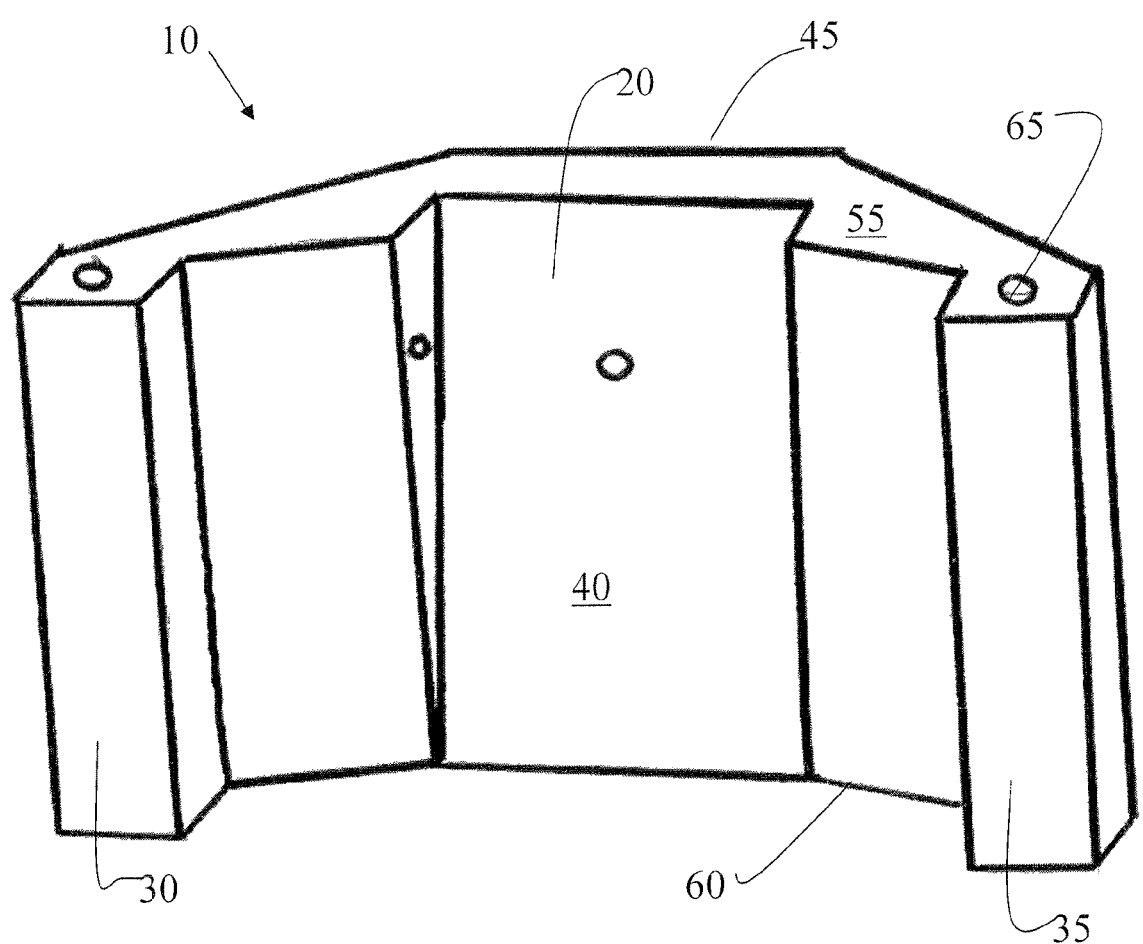
FIG. 3 front perspective view of the retention wall.

Referring to FIGS. 2 and 3, the center section 20 of the erosion control wall section 10 has a front face 40 that diverts the energy from oncoming waves and a rear face 45 with a stabilizing member 50 that secures the erosion control wall section 10 along the bank or bluff. The front face 40 of the center section 20 has a ramp that extends from the bottom face 60 to the top face 55 in the center section 20. The ramp forms an inclined surface upon which the energy from the approaching wave is dissipated. When traveling up the ramp, the energy from the oncoming wave dissipates due to the effect of its own gravity. The remainder of the surf travels up the substantially vertical left and right sidewalls of the erosion control wall section 10. The remaining surf will be dissipated further on by the front face 40 until reaching the ramp in the center section 20.

The dimensions of the erosion control wall section 10 are not limited to any particular configuration and may vary according to the dimensions of the bank or bluff along the body of water. The vertical height of the section 10 can be adjusted according to the height of the waves in a particular area, with other structural characteristics being proportionally modified. The height may be adjusted so as to dissipate the energy of the oncoming waves during movement along the front face 40 of the erosion control wall section 10. The height of each wall can be adjusted to be able to adequately dampen the water movement or waves before the later is deflected away at the uppermost ramped configuration, sending the water back to the bottom and causing dissipation of the next oncoming wave. Similarly, the width of the sections 10 can be adjusted according to the height of the waves in a particular area, with other structural characteristics being proportionally modified.

Figure 4:
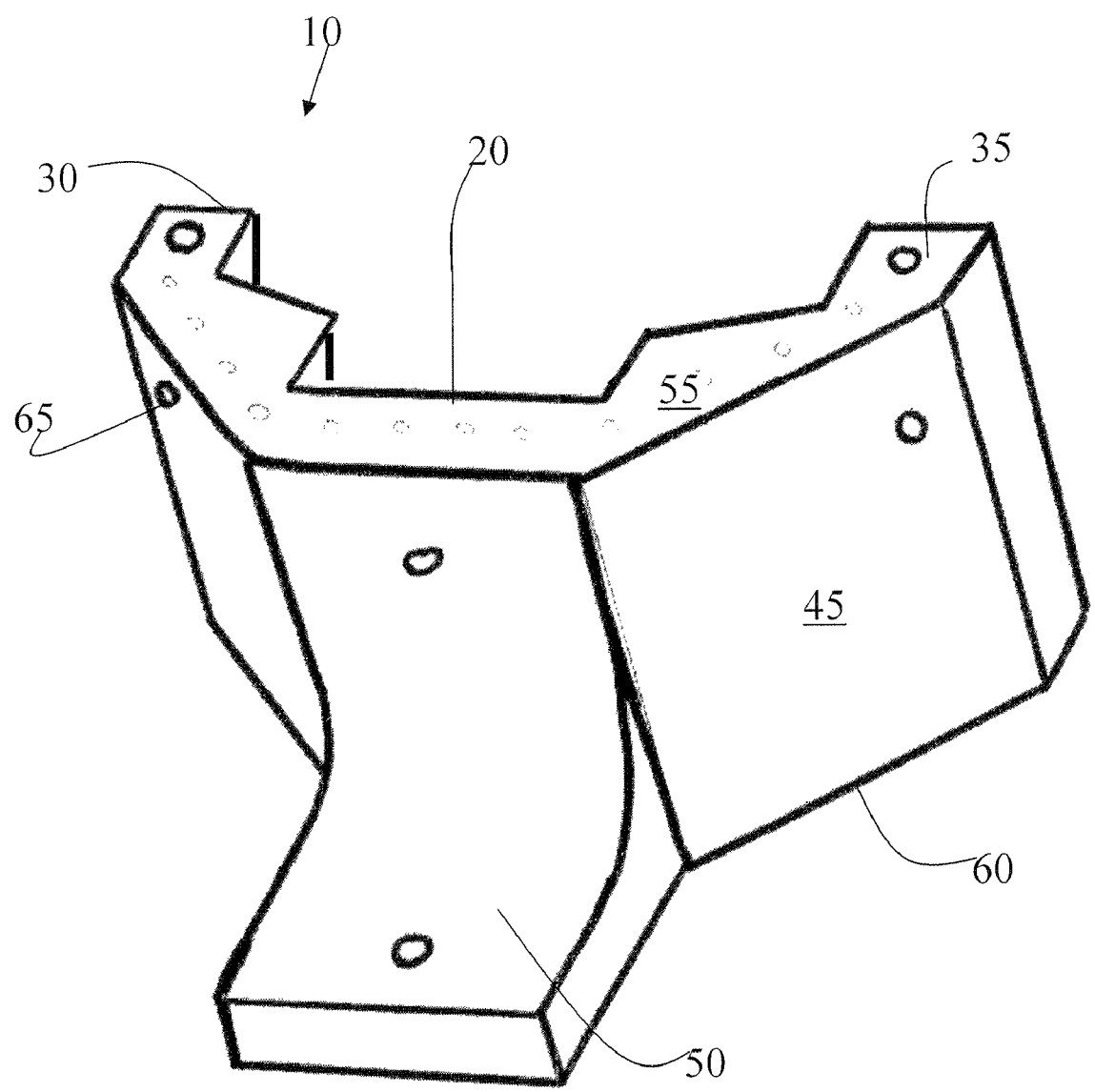
FIG. 4 is a rear perspective view of the retention wall.

Referring to FIG. 4, the stabilizing member 50 is a tongue that extends from the rear face 45 and is positioned toward the landward side of the body of water. The tongue may lie adjacent to the bank or bluff and may be covered with earth to position the erosion control wall section 10 along the body of water. The tongue has a curved surface adjacent the substantially vertical wall of the rear face 45 on the center section 20. The curved surface decreases in incline as it extends from the rear face 45 and forms a substantially horizontal surface parallel to the rear face 45. Earth such as dirt, sand or gravel may collect on the horizontal surface of the tongue to secure the erosion control wall section 10 in position. The tongue prevents the erosion control wall section 10 from tilting to one side or another due to wave action. The tongue may also have a mounting hole extending through the horizontal surface. A pipe, such as but not limited to, a solid steel pipe, may be inserted through the hole to prevent the tongue from moving in any direction. The earth covering the tongue should prevent the erosion control wall section 10 from movement, and the pipe prevents the tongue itself from further movement by wave action. The stabilizing member 50 may have a ramp-like configuration, such as extending at an angle of about 20 degrees from the rear face 45, or an angle of between 10 and 40 degrees for example. The wall section 10 is anchored in position by the action of waves carrying particulate materials over the erosion control wall member 10 and depositing it on the stabilizing member 50, wherein the erosion control wall member 10 through stabilizing member 50 is self-stabilizing.

Figure 5:
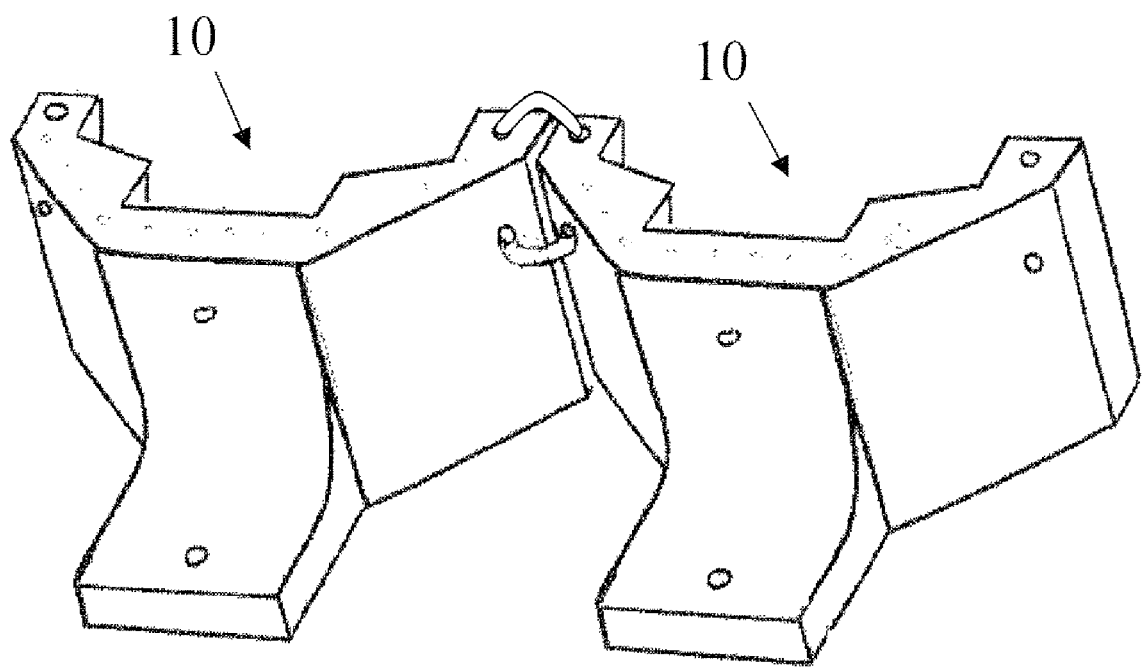
FIG. 5 shows a plurality of erosion control wall sections coupled together.

The left sidewall 30 and right sidewall 35 may have mounting apertures 65 extending through the walls from the front face 40 to the rear face 45. A cable or rope may be placed through the mounting apertures to lift the erosion control wall section 10 and place it along the bank or bluff. The left and right sidewalls also have mounting holes that extend through each sidewall and across the front of the center section 20. A lifting device may be inserted through the mounting holes. The lifting device may be constructed from a pipe such as a polyvinylchloride (PVC) or steel and placed through the mounting aperture 65 to reinforce the lifting device. The pipe is inserted horizontally through the holes in the left and right sidewalls. A portion of the pipe is exposed along the front face of the center section. A cable rope can be wrapped around the pipe to raise and lower the erosion control wall section. The sections 10 can also be coupled together, such as by a cable positioned and secured in one or more apertures, with the length of cable extending between adjacent wall members to couple the wall members together. Once positioned, the individual wall sections 10 can be coupled to one another, such as by a cable secured in the one or more apertures formed in the sections 10, and extending between sections 10, such as shown in FIG. 5. For example, a length of steel cable can be inserted into a hole formed in the wall section 10, such as hole 65, and a hydraulic cement can be poured in around it to secure it in the hole. The other end of the cable can then be similarly secured in a hole of an adjacent wall section 10 to secure the wall sections 10 together. The use of a hydraulic cement to secure the cable lengths in this fashion eliminates clamping and other labor or mechanisms to attach the wall sections together. The individual wall sections 10 may be fastened together with lengths of cable which allow for some relative movement between sections. Also, one or more holes formed in the wall sections 10 can act as drainage holes, to allow water to drain through the wall sections 10, such as from an adjacent bluff or the like, to thereby relieve any water pressure behind the wall sections 10.

In an alternative configuration, the erosion control wall section 10 may be positioned under the water instead of adjacent a bank or bluff. The tongue 50 remains facing landward while the erosion control wall section 10 is lowered under the water. In order to position the erosion control wall section, cables or ropes can be connected to pipe extending across the center section of the erosion control wall section 10. A trench can be dug out of the area where the erosion control wall section will be lowered. Dirt, sand or gravel can then placed over the stabilizing member 50 to keep the erosion control wall section in place. Upon placement of the wall sections in a body of water, sand, gravel and rocks moved by wave or current action tend to be moved over the wall sections and then are retained behind the wall sections, and can cause backfilling of materials in the area behind the wall sections.

The present disclosure also relates to a method of manufacturing a erosion control wall section 10 system. The erosion control wall section 10 may be manufactured at the location (on-site) of the bluff or bank using a slip form construction method. The slip form method involves a form (also referred to as a "mold") into which concrete is poured. The form may have a front section, back section, and stabilizing member 50 section. The front and back section may be pinned together while the stabilizing member 50 section is snapped into place. Before the concrete is poured, rebar may be placed inside the mold sections. The rebar can extend throughout each section of the mold including the stabilizing member 50 (tongue). An adhesive such as epoxy can be applied to the rebar in order to form reinforced sections. As the concrete is poured, it moves along the form as the previously poured concrete hardens behind it. The erosion control wall section 10 may be integrally formed according to the slip form construction method. In the alternative, the front section, back section and stabilizing member 50 section may be formed in a separate mold and attached together, such as through an adhesive or suitable manner. The method of manufacturing the erosion control wall section 10 may be used at any location, including, but not limited to at the site of the bank of bluff, or in the body of water.

Although the present erosion control wall section has been directed specifically to a system used to protect bank and bluffs against erosion caused by sea waves, it may also be used to control erosion in other places, for example, soil erosion on a hill slope. Therefore, apparent variations and modifications of the presently disclosed erosion control system may occur to those skilled in the art, especially after benefiting from the teaching, suggestion, motivation and obvious renderings of the erosion control system. Such variations and modifications are within the scope and spirit of the erosion control system and methods claimed hereinafter.

What is claimed is:

1. An erosion control wall component system for use in a body of water comprising:
   a plurality of wall members having a center section, one or more sidewalls, a front face extending from the left sidewall to the right sidewall; wherein the front face is positioned to divert water energy from incoming waves or currents near adjacent land, and
   a rear face extending from the left sidewall to the right sidewall that stabilizes the wall member in position, and having a top and bottom face, and
   a stabilizing member extending from the rear face toward the adjacent land, such that upon positioning of the wall system in a body of water, the stabilizing member self-stabilizes the wall member to facilitate retaining the position of the wall member in the body of water against the action or waves or currents exerted on the front face, and
   wherein the stabilizing member comprises at least one inclined wall adjacent to the rear face to support dynamic and directional pressures exerted by liquids or solids on the front face of the wall member, and
   wherein the at least one inclined wall is curved adjacent the substantially vertical wall of the rear face, and the curved surface decreases in incline as it extends from the rear face to a substantially horizontal surface.

2. The erosion control wall of claim 1, wherein the center section has at least one ramped wall and at least one substantially vertical wall opposite the ramped wall.

3. The erosion control wall of claim 1, wherein the rear face has one or more substantially vertical walls.

4. The erosion control wall of claim 1, wherein the stabilizing member is a tongue extending from the rear face.

5. The erosion control wall of claim 1, further comprising one or more apertures in the one or more sidewalls.

6. The erosion control wall of claim 5, wherein a cable is positioned in each aperture.

7. The erosion control wall of claim 1, further comprising one or more mounting holes in the center section and the one or more sidewalls.

8. The erosion control wall of claim 7, wherein a lifting device may be positioned in the mounting holes for positioning the retention wall along a bank or bluff.

9. The erosion control wall of claim 1, wherein the stabilizing member comprises at least one mounting hole through which a securing member is selectively positioned to extend into the surface on which the wall member is positioned in the body of water to retain the stabilizing member in position.

10. The erosion control wall of claim 1, wherein the stabilizing member comprises a ramp-like configuration, and extends at an angle of between about 10 and 40 degrees from the rear face.

11. The erosion control system of claim 1, wherein the stabilizing member is anchored in position after installation within a body of water by the action of waves or currents carrying particulate materials over the plurality of wall members and depositing it on the stabilizing member, wherein the plurality of wall members are self-stabilizing through the particulate material deposited on the stabilizing member.

* * * * *